United States Patent
Rivola et al.

(10) Patent No.: US 11,535,408 B2
(45) Date of Patent: Dec. 27, 2022

(54) DOSING DEVICE FOR FEEDING AN INFUSION PRODUCT

(71) Applicant: I.M.A. Industria Macchine Automatiche S.p.A., Ozzano Dell'Emilia (IT)

(72) Inventors: Sauro Rivola, Ozzano Dell'Emilia (IT); Dylan Forni, Ozzano Dell'Emilia (IT); Luca Bernardini, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 718 days.

(21) Appl. No.: 16/486,719

(22) PCT Filed: Feb. 16, 2018

(86) PCT No.: PCT/IB2018/050958
§ 371 (c)(1),
(2) Date: Aug. 16, 2019

(87) PCT Pub. No.: WO2018/162998
PCT Pub. Date: Sep. 13, 2018

(65) Prior Publication Data
US 2020/0231310 A1    Jul. 23, 2020

(30) Foreign Application Priority Data
Mar. 9, 2017    (IT) .................. 102017000026139

(51) Int. Cl.
*B65B 1/34*    (2006.01)
*G01G 15/00*    (2006.01)
(Continued)

(52) U.S. Cl.
CPC .............. *B65B 1/34* (2013.01); *B65B 29/028* (2017.08); *B65B 37/10* (2013.01); *B65B 37/18* (2013.01); *B65B 57/14* (2013.01); *G01G 15/001* (2013.01)

(58) Field of Classification Search
CPC ...... G01G 15/001; B65B 1/34; B65B 29/028; B65B 37/10; B65B 37/18; B65B 7/14
(Continued)

(56) References Cited

U.S. PATENT DOCUMENTS 2,280,614 A * 4/1942 Ayars ...................... B65B 1/32
                                                              251/185
3,073,398 A * 1/1963 Blodgett .................. B65B 1/34
                                                              177/53
(Continued)

FOREIGN PATENT DOCUMENTS

CN        1368461 A    9/2002
CN        1829632 A    9/2006
(Continued)

OTHER PUBLICATIONS

International Search Report and Written Opinion dated Apr. 10, 2018 for counterpart International Patent Application No. PCT/IB2018/050958.
Chinese Office Action dated Nov. 3, 2020 from counterpart Chinese Pateht Applicaiton No. 201880016243.0.

*Primary Examiner* — Randy W Gibson
(74) *Attorney, Agent, or Firm* — Shuttleworth & Ingersoll, PLC; Timothy J. Klima (57) ABSTRACT

A dosing device for feeding an infusion product includes: a tower for containing product, tubular channels for feeding the product to the tower; each channel configured to pick up the product from the tower and release a quantity of product; a plurality of containers for receiving the product from the channels; a platform movable relative to the channels sup-
(Continued)

porting the containers one after another. The platform is configured for carrying, in sequence, each container to a first position for feeding a quantity of product less than the weight of a programmed dose and, subsequently, to a second position for feeding a remaining quantity of product for reaching the weight of the programmed dose. A plurality of weighing elements control the weight of the product in each container and a control unit controls the quantity of product fed to each container and the relative movement of the platform.

14 Claims, 5 Drawing Sheets

(51) Int. Cl.
  *B65B 37/18* (2006.01)
  *B65B 29/02* (2006.01)
  *B65B 37/10* (2006.01)
  *B65B 57/14* (2006.01)

(58) Field of Classification Search
  USPC .................................................. 177/54, 145
  See application file for complete search history.

(56) References Cited

U.S. PATENT DOCUMENTS

| | | | | |
|---|---|---|---|---|
| 3,556,234 | A | * | 1/1971 | Moreno ................. G01G 13/00 177/122 |
| 3,557,847 | A | * | 1/1971 | Hebel ...................... B65B 1/34 141/54 |
| 4,407,379 | A | * | 10/1983 | Pryor ..................... G01G 13/04 73/1.13 |
| 2003/0089421 | A1 | | 5/2003 | Hill |
| 2012/0210675 | A1 | * | 8/2012 | Murray .................. B65B 43/60 141/63 |
| 2014/0048172 | A1 | | 2/2014 | Tomioka et al. |

FOREIGN PATENT DOCUMENTS

| | | |
|---|---|---|
| CN | 101454207 A | 6/2009 |
| CN | 202522305 U | 11/2012 |
| CN | 104936862 A | 9/2015 |
| CN | 205611658 U | 10/2016 |
| EP | 0879762 A1 | 11/1998 |
| EP | 1498351 A1 | 1/2005 |
| GB | 1001640 A | 8/1965 |
| GB | 1429679 A | 3/1976 |
| WO | 03042641 A2 | 5/2003 |
| WO | 2006027665 A1 | 3/2006 |

* cited by examiner

DOSING DEVICE FOR FEEDING AN INFUSION PRODUCT

This application is the National Phase of International Application PCT/IB2018/050958 filed Feb. 16, 2018 which designated the U.S.

This application claims priority to Italian Patent Application No. 102017000026139 filed Mar. 9, 20175, which application is incorporated by reference herein.

TECHNICAL FIELD

This invention relates to a dosing device for feeding an infusion product.

In particular, the device according to this invention can be used for measured feeding of an infusion product, such as tea, coffee, camomile or the like, to an automatic machine for forming infusion packets, which the present specification expressly refers to but without restricting the scope of the invention.

BACKGROUND ART

The automatic machines designed for making infusion packets, such as filter bags, filter-paper pods etc., comprise a plurality of operating stations (usually) located in succession along a production line of the automatic machine (a line which may extend horizontally or vertically according to the type of machine).

Each automatic machine also comprises a feed station designed for feeding quantities or doses of infusion product on a continuous web of filter material used to make the packets.

A prior art solution of feed station widely used is the type known as "volumetric".

This solution comprises a dosing device comprising a drum rotating about an axis (normally horizontal).

The rotary drum is interposed between a web of filter material and a hopper containing the infusion product. The drum comprises a plurality of radial chambers for containing the infusion product and in which are slidably positioned respective dosing pistons.

Each of the pistons is axially movable, by respective eccentric movement means, between at least two operating positions:
  one for receiving a quantity of product, wherein the chamber is facing the hopper, wherein the piston is lowered radially, and
  one for releasing the dose of product, wherein the chamber is facing the web of filter material in order to release the quantity of infusion product on the web, and wherein the piston is advanced radially.

Moreover, the dosing device is equipped with a levelling tile, consisting of an arched wall, positioned along the trajectory of passage of the drum between the product loading zone and the product release zone. The tile is used to trim the volume of product dosed inside the passage chamber by means of a levelling of the excess product in the chamber.

This solution of the dosing device has proved effective and accurate and has made it possible to significantly increase the continuous working speeds of modern automatic machinery for the packaging of infusion products, if the product handles is in the form of powder or small granules.

However, if the product is "delicate" or "high quality", such as, for example, a leaf infusion product or in granular form with large dimensions, this type of device is unsuitable.

In fact, the leaf product or in granular form with large dimensions must be packaged without altering the consistency in order to maintain its quality during infusion.

Therefore, these features of the infusion product require a step of dosing by dosing devices with logic for weighing the product, since the dosing must be performed slowly, with precision, and measuring the quantity of product of each dose due to their size and composition.

A prior art solution of dosing device for this type of product comprises:
  a hopper, usually with a vertical axis, for containing the infusion product;
  a plurality of tubular dosing channels/chutes positioned in series one alongside the other, and connected, at a first end, to the hopper; each channel/chute is positioned inclined and rotates about the relative longitudinal axis of extension to transport the quantity of product to be dosed from the top downwards;
  a plurality of containers for receiving the dosed product from the channels/chutes; each container is positioned under a corresponding second end of a dosing channel/chute;
  a plurality of scales for controlling the quantity of dosed product; each scale being positioned under a corresponding container;
  a conveyor having an inlet opening facing the plurality of containers and an outlet opening configured for conveying and positioning, at a single point, the dose received from a single container at a time on a web of filter material positioned horizontally under the conveyor.

This dosing device works as follows for each individual dosing unit comprising channel, container, scales:
  the channel/chute feeds (through the relative rotation combined with the angle of inclination) the corresponding container with a quantity of product;
  the container is weighed by the corresponding scales and, if the weight is correct, consent is given for enabling the opening of a door fitted to the container for releasing the dose of product inside the conveyor in such a way as to enable the dose of product to reach the web of filter material.

This type of device has two main drawbacks: it is structurally very bulky and it has an extremely low dosing speed.

The first drawback is due to the arrangement in series of the channels/chutes which results in having an extremely long structure of the dosing device.

The second drawback is due both to the specific features of the product and to the structure of the device which, in effect, has a dosing constrained to a single depositing of the dose at a time, irrespective of the number of channels/chutes present, to be able to guarantee high dosing precision. This therefore determines a low production of filter bags per unit time by the forming machine located downstream of the dosing device.

DISCLOSURE OF THE INVENTION

The aim of this invention is to provide a dosing device for feeding an infusion product which overcomes the above-mentioned drawbacks.

More specifically, the aim of this invention is to provide a dosing device for feeding an infusion product which is able to perform a dosing of product which is precise and with a high productivity per unit time.

A further aim of this invention is to provide a dosing device for feeding an infusion product which is reduced in size and able to adapt to various types of product and the various machines for forming filter-bags without any structural modification.

These aims are fully achieved by the dosing device for feeding an infusion product according to this invention as characterised in the appended claims.

BRIEF DESCRIPTION OF THE DRAWINGS

These and other features of the invention will become more apparent from the following detailed description of a preferred, non-limiting embodiment of it, with reference to the accompanying drawings, in which.

DETAILED DESCRIPTION OF PREFERRED EMBODIMENTS OF THE INVENTION

Figure 1:
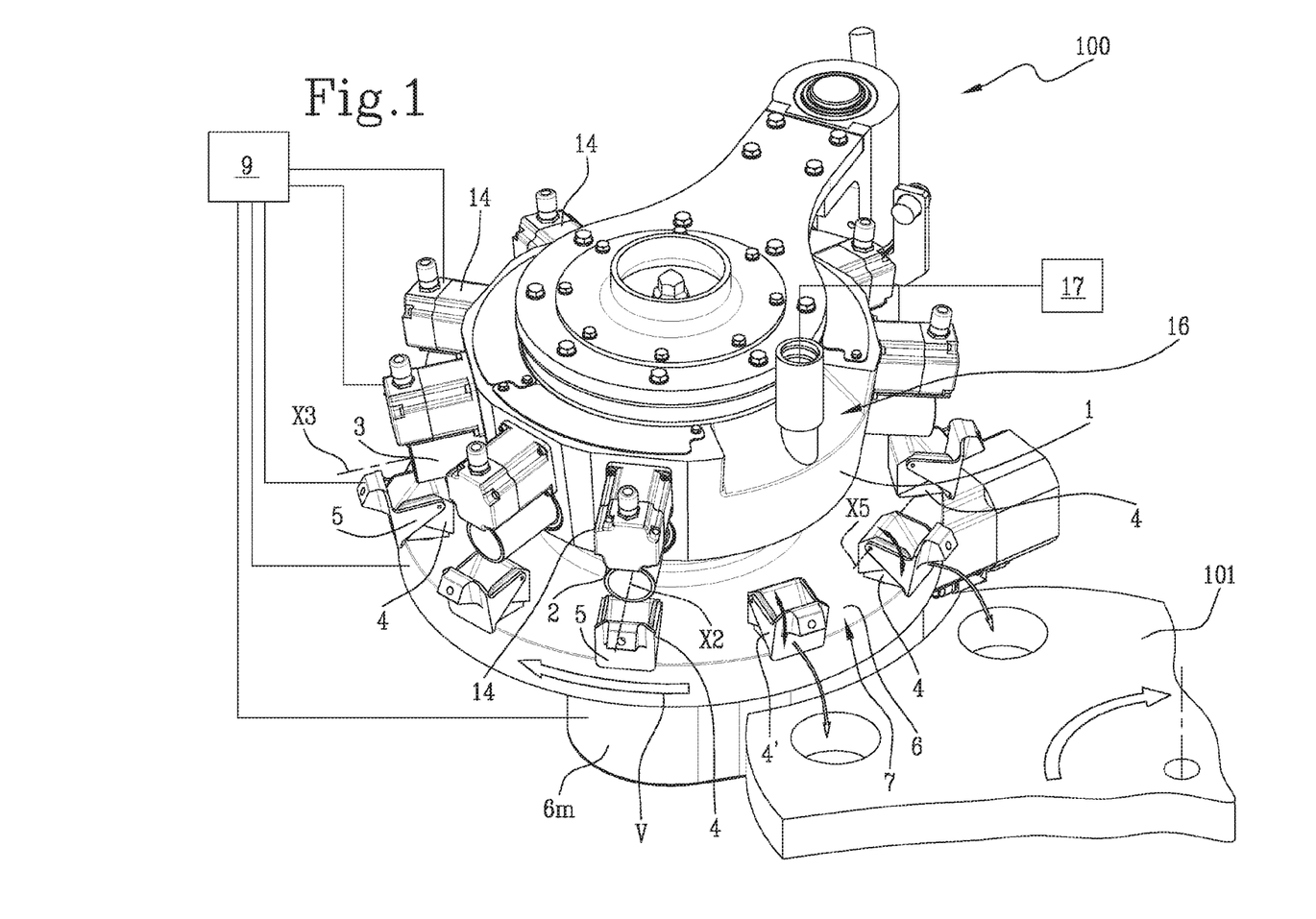
FIG. 1 illustrates a perspective view from above, with some parts cut away to better illustrate others, of a dosing device for feeding an infusion product according to this invention.
Figure 2:
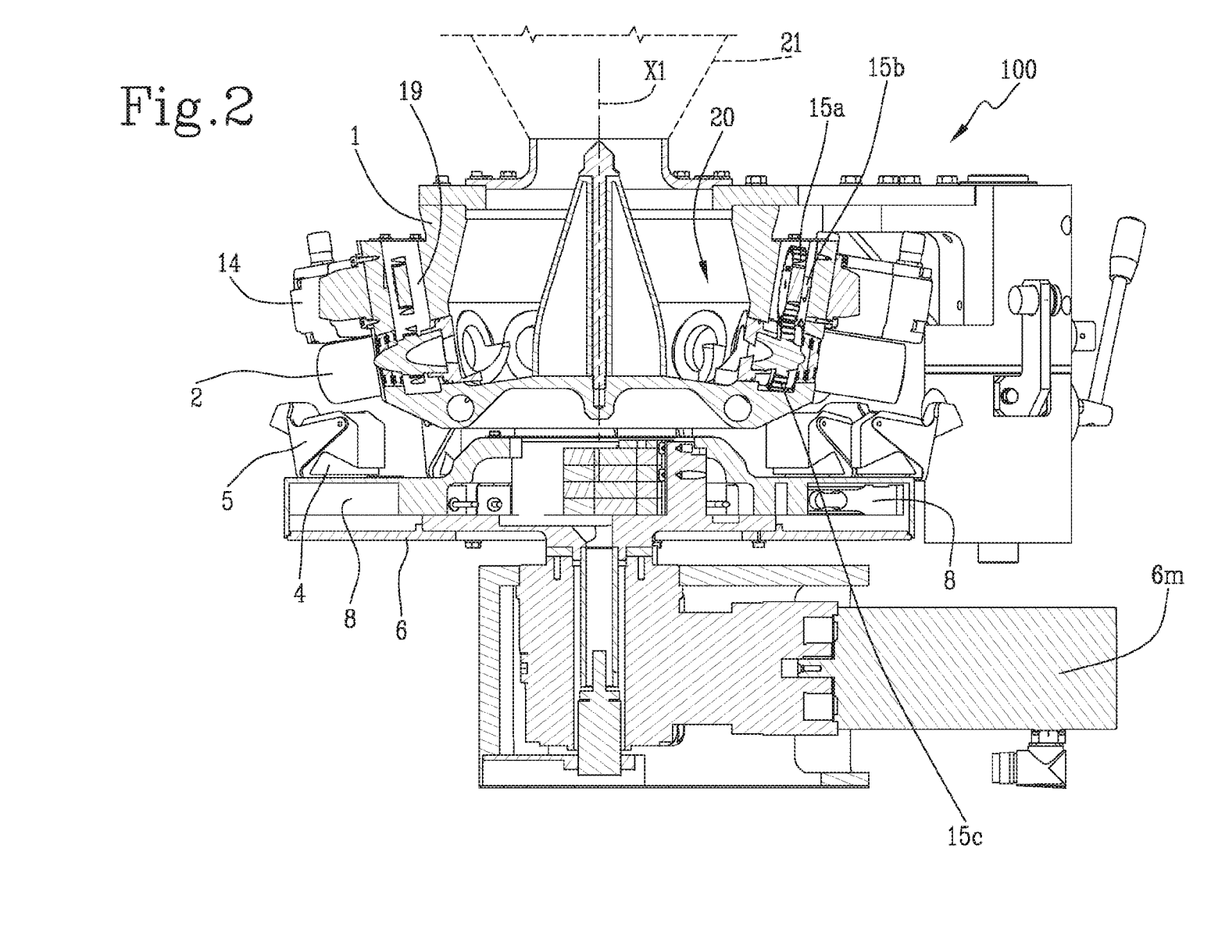
FIG. 2 illustrates a front view, with some parts in cross section to better illustrate others, of the dosing device of FIG. 1.

With reference to the accompanying drawings, and in particular to FIGS. 1 and 2, the dosing device according to the invention, labelled 100 in its entirety, is used for feeding an infusion product for forming filter bags in automatic machines (not illustrated).

More specifically, but without limiting the invention, this dosing device 100 is used for forming doses of "high quality" infusion product, that is, formed by components in leaf form or in granular form with large dimensions and which must be treated with greater care relative to a product in powder form or in any case with reduced size.

This dosing device 100 comprises a tower 1 for containing loose infusion product.

The dosing device 100 also comprises at least one pair of tubular channels 2, 3 for feeding infusion product connected to and in communication with the containing tower 1.

Each tubular channel 2 and 3 is configured to allow the picking up of the product from the tower 1 and the release of a controlled quantity of product, by weight, at its outer free end.

The dosing device 100 also comprises a plurality of containers 4 for receiving the infusion product from the tubular channels 2, 3.

Each container 4 has a wall 5 which is movable between a closed position of the container 4 and an open position for discharging a programmed dose of product.

The dosing device 100 also comprises a platform 6 which is movable (with a direction V) relative to the tubular channels 2, 3 and positioned under the tubular channels 2, 3.

On the platform 6 is associated the plurality of containers 4 located one after the other along the platform 6.

The platform 6 is configured for moving, in sequence, each container 4 to a first position for feeding a first quantity of product, by weight, less than the weight of a programmed dose, by falling from a first tubular channel 2 of the pair of tubular channels 2, 3, and, subsequently, to a second position, downstream of the previous position relative to a feed direction V, for feeding a remaining quantity of product, by weight, useful for reaching the weight of the programmed dose, falling from the second tubular channel 3 of the pair of tubular channels 2, 3, and again, subsequently, in a zone 7 for discharging the dose of programmed infusion product.

The dosing device 100 comprises a plurality of weighing elements 8 positioned along the path followed by the platform 6 and configured to control the weight of the product fed by each tubular channel 2, 3 in each container 4.

Moreover, the dosing device 100 comprises a control unit 9 connected to each tubular feeding channel 2, 3, to each weighing element 8 and to the platform 6.

The control unit 9 is programmed to control the quantity of product fed from the first and second channels 2 and 3 to each container 4 and the relative movement of the platform 6 (as described in detail below).

As illustrated in FIGS. 1 to 4, in a non-limiting example embodiment, the containing tower 1 has a first axis X1 of longitudinal extension.

As may be also noted in FIGS. 1 to 4, each channel 2 and 3 radially protrudes from the containing tower 1 (here in a tubular cylindrical shape).

Preferably, each tubular channel 2 and 3 protrudes from the containing tower 1 and rotates about a corresponding second axis X2, X3 of longitudinal extension.

Moreover, in the case illustrated, the platform 6 has a circular shape (and surrounds the tower 1 for containing the product), and rotates about the axis X1 in the direction V and along a circular path.

The platform 6 is movable thanks to a drive unit 6m. Preferably, the movable platform 6 moves with an intermittent motion (that is, in a stepwise fashion).

According to the solution illustrated, the plurality of weighing elements 8 is positioned along the circular path followed by the platform 6.

Figures 3, 4:
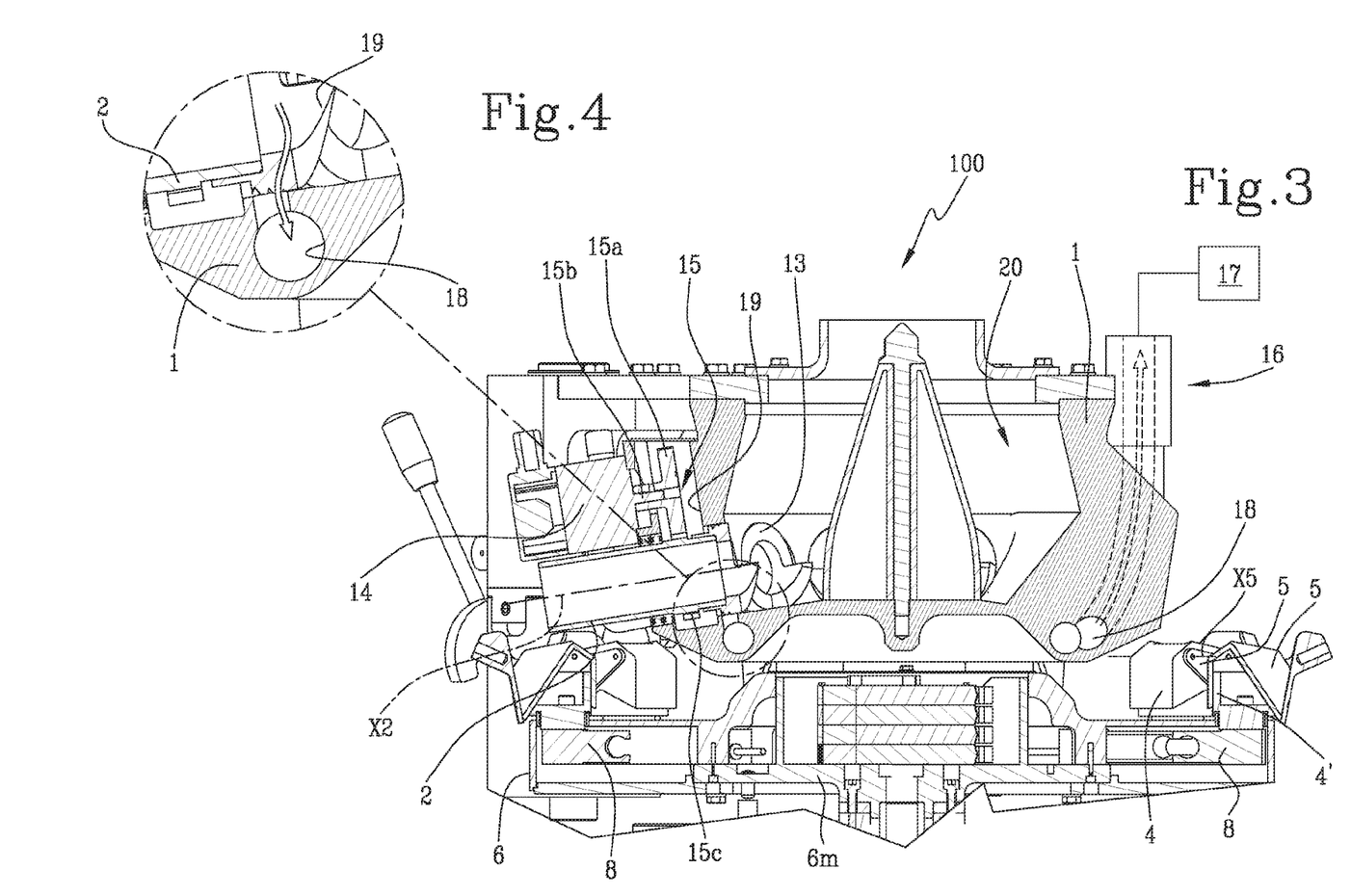
FIG. 3 illustrates a front view opposite to that of FIG. 2, with some parts in cross section to better illustrate others, of the dosing device of FIG. 1.
FIG. 4 illustrates an enlarged detail of FIG. 3.

FIGS. 1 to 3 show a first solution wherein each weighing element 8 (for example, a load cell) is positioned on the platform 6 (for example integrated within the same platform), which is movable with the platform 6, and under a corresponding container 4.

Figure 5:
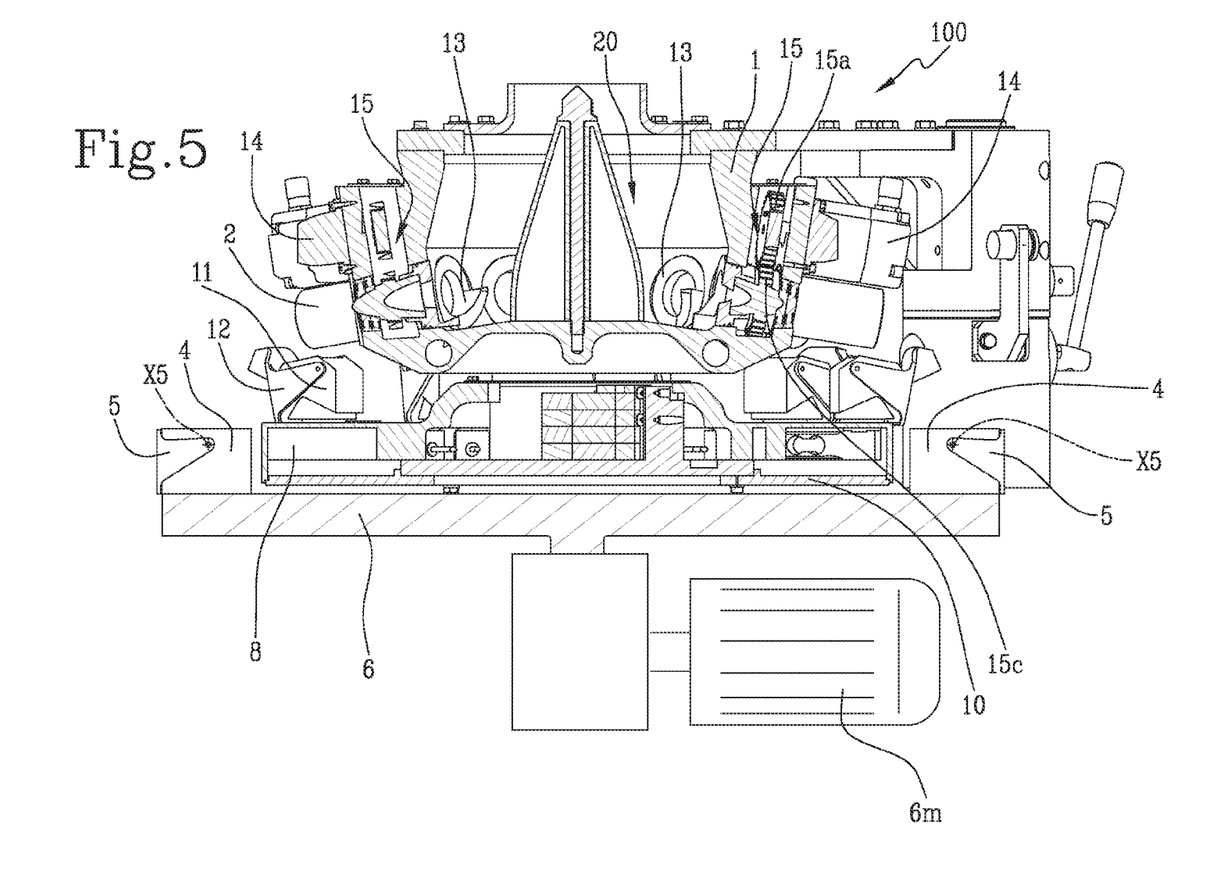
FIG. 5 illustrates a side view, with some parts in cross section to better illustrate others, of a variant embodiment of the dosing device of the above drawings.

In a variant embodiment illustrated in FIG. 5, the dosing device 100 comprises a further fixed platform 10, which is placed over the movable (rotating) platform 6.

In the case illustrated, the fixed platform 10 (also circular) supports a second plurality of containers 11 for receiving the quantity of product falling from a corresponding tubular channel 2, 3 and the plurality of weighing elements 8.

Each weighing unit 8 is positioned under a corresponding container 11 of the second plurality.

In light of this, each container 11 of the second plurality is provided with a wall 12 which is movable between a closed position of the container 11 and an open position for the passage by falling of the infusion product towards a corresponding container 4 of the first plurality located in the underlying movable platform 6.

In both solutions, there is in any case a high speed of feeding the product combined with a dosing precision and extremely reduced overall size of the device.

Preferably, each tubular channel 2, 3 has a screw profile 13 formed on its free end, inside the tower 1 for containing the product, for picking up of the product.

It should be noted that the dosing device 100 comprises a drive unit 14 for each tubular channel 2, 3.

Each drive unit 14 is supported by the containing tower 1 and positioned above the corresponding tubular channel 2, 3.

In light of this, between each drive unit 14 and the corresponding tubular channel 2, 3 is interposed a kinematic unit 15 for connecting to and driving the motion to the tubular channel 2, 3. Each kinematic unit 15 is housed in the compartment 19 made on the containment tower 1.

As shown in FIGS. 3 and 4, each kinematic unit 15 consists of a first gear wheel 15a keyed on a motor-driven shaft 15b. The first gear wheel 15a is engaged on a toothed ring 15c connected rigidly to the outer surface of the corresponding tubular channel 2, 3 in such a way as to enable the latter to rotate about the relative longitudinal axis X2, X3 under the action of the drive unit 14.

It should be noted that each drive unit 14 is connected to the control unit 9 programmed for controlling the drive unit 14 in such a way as to obtain a rotation of the corresponding channel according to time and speed of rotation parameters as a function of the quantity of infusion product to be fed to the containers 4 in transit.

Preferably, the dosing device 100 comprises a suction unit 16 associated with the containing tower 1.

The suction unit 16 has a suction source 17 connected to a channel 18 (annular, in the case illustrated) connected to containing compartments 19 of the tubular channels 2, 3 made in the containing tower 1 (see FIG. 4).

The suction unit 16 allows a constant cleaning of dust or material in suspension of the various moving components positioned inside the compartments 19.

Preferably, the containing tower 1 comprises a chamber 20 configured for distributing the infusion product to the tubular channels 2, 3 and a hopper 21 (illustrated partially with a dotted line 2), positioned above the chamber 20, for the feeding, by controlled falling, of the infusion product into the chamber 20.

In light of this, the chamber 20 is equipped with a circular lower base configured in the form of a chute (that is to say, with a gradual inclination to descend from the centre of the chamber 20 towards the outside where there are the tubular channels 2, 3) which is able to always maintain a predetermined level of loose infusion product available for the tubular channels 2, 3.

Preferably, according to a preferred non-limiting embodiment, the dosing device 100 comprises a plurality of tubular channels 2, 3 with a number smaller, by at least one, than the number of containers 4 present on the movable platform 6 in such a way as to define, along the path of the platform 6, a free zone corresponding to the zone 7 for discharging the infusion product by the containers 4.

As a construction example, the dosing device 100 in the accompanying drawings comprises eight tubular ducts and ten containers equally spaced on the movable (rotating) platform 6.

The two containers 4 and 4' which, each time, are brought into a zone not engaged by tubular channels 2, 3 are the containers containing the programmed dose of product and perform the discharging of the dose to a unit 101 for receiving the dose and preparing the dose in filter-bags being formed (illustrated schematically).

Preferably, each container 4 has the movable wall 5 (a front wall facing towards the outside of the platform 6) articulated, in direction X5, on two further side walls of the container 4 in such a way as to rotate between the closed position of the container 4 and the open and discharging position of the infusion product.

Each movable wall 5 is connected to devices (not illustrated) designed to allow the rotation of the wall 5 at the positioning of the container 4 in the discharging zone 7.

This invention also provides a method for feeding doses of an infusion product for making filter bags.

The method comprises at least the following steps:
preparing a first quantity, by weight, of infusion product less than a predetermined quantity, by weight, of a programmed dose of infusion product, in a first tubular channel 2;
depositing, by falling, the first quantity of infusion product in a container 4 positioned on a platform 6 which is movable relative to the tubular channel 2;
weighing the first quantity of infusion product deposited;
preparing a second quantity of infusion product in a second tubular channel 3, after the previous first channel 2 relative to a feed direction V of the platform 6, of a quantity of product, by weight, useful for reaching the weight of the programmed dose;
moving the platform 6 to allow the container 4 to move from the first 2 to the second 3 tubular channel;
depositing, by falling, the second quantity of infusion product in the container 4;
weighing the quantity of infusion product present in the container 4;
moving the platform 6 for carrying the container 4 with the programmed dose of infusion product beyond the second tubular channel 3;
discharging the programmed dose from the container 4.

In the examples of the dosing device 100 described above, there is a plurality of containers 4 positioned one after the other on the platform 6 and a plurality of tubular channels 2, 3 positioned one after the other and with a number smaller, by at least one, than the number of the containers 4.

Figure 6:
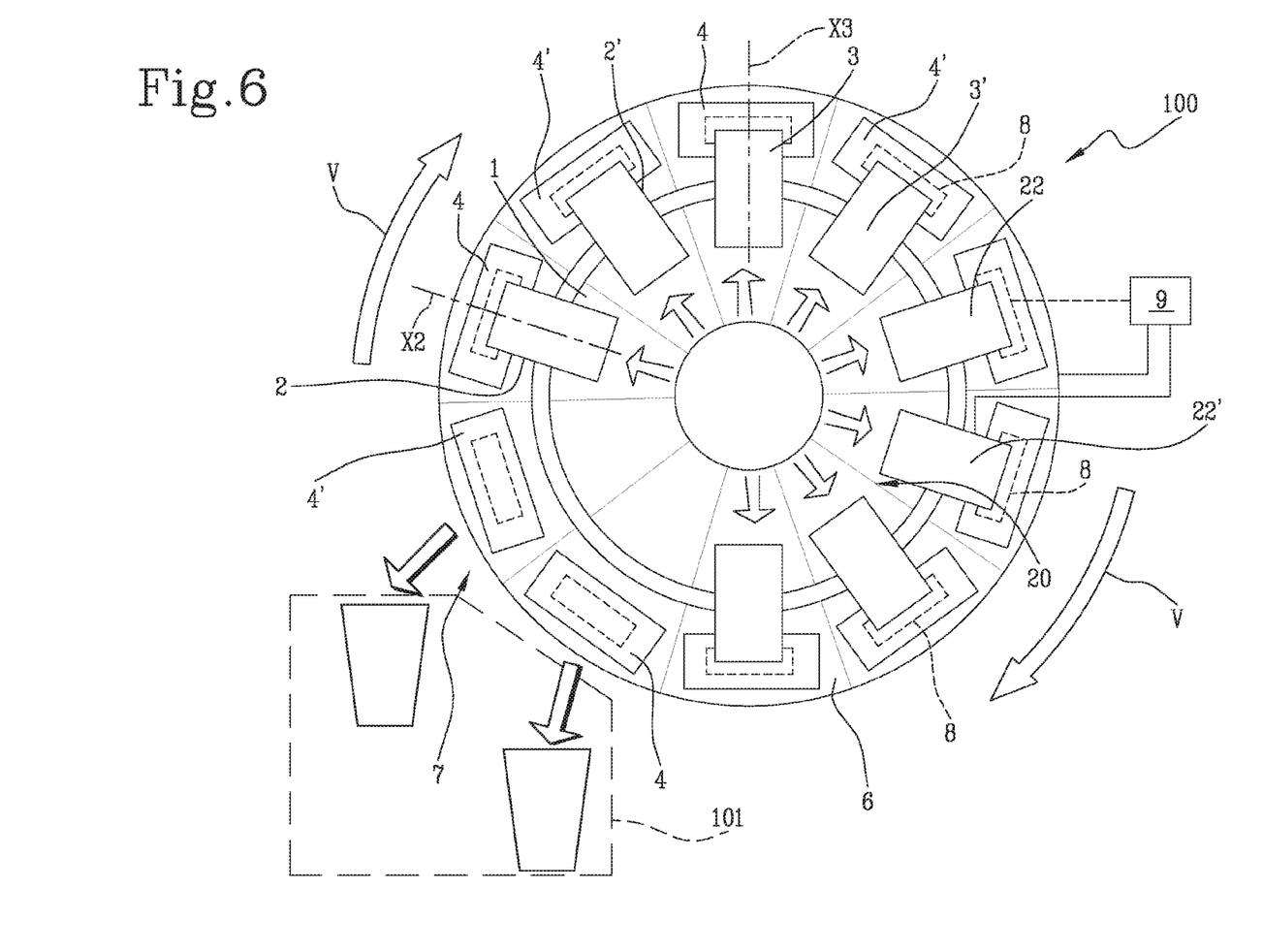
FIG. 6 illustrates a top plan view of a process diagram of the dosing device of FIGS. 1 to 4.

In this configuration (see also FIG. 6), the method comprises the following steps:
preparing a first quantity, by weight, of infusion product less than a predetermined quantity, by weight, of a dose of infusion product, in a first tubular channel 2;
depositing, by falling, the first quantity of infusion product in a container 4 positioned on the platform 6 which is movable relative to the first tubular channel 2;
weighing the first quantity of infusion product deposited in the container 4;
preparing a second quantity of infusion product in a second tubular channel 3, after the previous first tubular channel 2 relative to the feed direction V of the platform 6, of a quantity of product, by weight, additional to the first quantity of infusion product;
moving the platform 6 to allow the container 4 to move from the first 2 to the second 3 tubular channel;
depositing, by falling, the second quantity of infusion product in the container 4;
weighing the quantity of infusion product present in the container 4;
preparing a third quantity in a third tubular channel 22, after the previous second tubular channel 3, of a quantity of product, by weight, useful for reaching the weight of the programmed dose;
moving the platform 6 to allow the container 4 to move from the second 3 to the third 22 tubular channel;
depositing, by falling, the third quantity of infusion product in the container 4;

weighing the quantity of infusion product present in the container 4;

moving the platform 6 for carrying the container 4 with the programmed dose of infusion product beyond the third tubular channel 22;

discharging the programmed dowse from the container 4.

Preferably, each step of preparing and depositing quantities of product is performed simultaneously by two tubular channels 2, 2', 3, 3', 22, 22' side by side, with equal quantities, by weight, of infusion product, in two containers 4, 4' which are contiguous to each other.

Preferably, before the last preparing and feeding of the quantity, by weight, of infusion useful for reaching the weight of the programmed dose, there is a step of stopping and weighing the container(s) 4, 4' without feeding and depositing the infusion product.

In the alternative embodiment illustrated in FIG. 5, the steps of the method may consist of the following different sequence:

preparing a quantity, by weight, of infusion product equal to a predetermined quantity, by weight, of a programmed dose of infusion product, in a first tubular channel 2;

preparing a quantity, by weight, of infusion product equal to a predetermined quantity, by weight, of a programmed dose of infusion product, in a second tubular channel 3 positioned downstream of the first channel 2 with respect to the direction V;

depositing, by falling, of the two quantities of infusion product in corresponding containers of the second plurality of receiving containers 11 positioned on the platform 10 fixed relative to the first 2 and to the second 3 tubular channels;

weighing of the two quantities of infusion product placed in the corresponding two containers 11 of the second plurality of containers;

depositing, by falling, of the two quantities of infusion product from the two containers 11 of the second plurality in corresponding containers 4, 4' positioned on the platform 6 which is movable relative to the fixed platform 10 and to the first and second tubular channels 2, 3;

moving the platform 6 for carrying the containers 4, 4' with the programmed dose of infusion product beyond the second tubular channel 3;

discharging the programmed dose from the containers 4, 4'.

Preferably, but without limiting the invention, the step of depositing the quantity of product from the first and second channel 3 and 4 in the corresponding containers 11 of the second plurality of containers may be performed simultaneously.

Similarly, the step of weighing on the two containers 11 of the second plurality of containers may be performed simultaneously, as also the step of depositing the product from the two containers 11 to the two containers 4, 4' positioned on the movable platform 6 may be performed simultaneously.

The preset aims are achieved thanks to this dosing device.

More specifically, the dosing device has a multi-head structure which can speed up each single dosing, which normally has a significant duration which affects the overall machine cycle, thanks to the dividing into two or more successive steps until obtaining the programmed weight.

This dosing system, together with the circular structure of the doser, makes it possible to reduce the cycle time of the single dose by means of a parallelism of the dosing steps and to reduce the overall size of the entire structure of the dosing station.

The invention claimed is:

1. A dosing device for feeding an infusion product for making filter bags, wherein it comprises:

a tower for containing loose infusion product;

at least one pair of tubular channels for feeding product connected to and in communication with the tower; the pair of tubular channels projecting from the containing tower and configured to allow the picking up of the product from the tower and the release of a quantity of product at its outer free end;

a plurality of containers for receiving the infusion product from the tubular channels and each having a wall which is movable between a closed position of the container and an open position for discharging a programmed dose of product;

a movable platform positioned under the tubular channels, and on which is associated the plurality of containers located one after the other along the platform; the platform being configured for moving, in sequence, each container to a first position for feeding a first quantity of product, in weight, less than the weight of a programmed dose, by falling from a first tubular channel of the pair of channels, and, subsequently, to a second position, downstream of the previous position relative to a feed direction of the platform, for feeding a remaining quantity of product, in weight, useful for reaching the weight of the programmed dose, falling from a second tubular channel of the pair of channels and again, subsequently, in a zone for discharging the dose of programmed infusion product;

a plurality of weighing elements positioned along the path followed by the platform and configured to control the weight of the product fed by the first and second tubular channels (2, 3) in each container;

a control unit connected to each tubular feeding channel, to each weighing element and to the platform and programmed to control the quantity of product fed from the first and second channels to each container and the relative movement of the platform.

2. The device according to claim 1, wherein the containing tower has a first axis of longitudinal extension and wherein the platform has a circular in shape and rotates about the axis according to the feed direction.

3. The device according to claim 1, wherein each tubular channel rotates about a corresponding second axis of longitudinal extension.

4. The device according to claim 1, wherein each weighing element is positioned on the platform, movable with it, and under a corresponding container.

5. The device according to claim 1, comprising a further fixed platform, which is placed over the movable platform; the fixed platform supporting a second plurality of containers for receiving the quantity of product by falling from a corresponding tubular channel and the plurality of weighing elements, each of which being positioned under a corresponding container of the second plurality; each container of the second plurality being provided with a wall which is movable between a closed position of the container and an open position for the passage by falling of the infusion product towards a corresponding container of the first plurality located in the underlying movable platform.

6. The device according to claim 1, wherein each tubular channel has a screw profile formed on its free end, inside the tower for containing the product, for picking up of the product.

7. The device according to claim 1, comprising a drive unit, for each tubular channel; each drive unit being supported by the containing tower and connected to the corresponding tubular channel; between each drive unit and the corresponding tubular channel being interposed a kinematic unit for connecting to and driving the motion to the tubular channel.

8. The device according to claim 1, comprising a suction unit associated with the containing tower; the suction unit having a suction source connected to a channel connected to containing compartments of the tubular channels made in the containing tower.

9. The device according to claim 1, wherein the containing tower comprises a chamber configured for distributing the infusion product to the tubular channels and a hopper, positioned above the chamber, for the feeding, by controlled falling, of the infusion product into the chamber.

10. The device according to claim 1, comprising a plurality of tubular channels with a number smaller, by at least one, than the number of containers present on the movable platform in such a way as to define, along the path of the platform, a free zone corresponding to the zone for discharging the infusion product by the containers.

11. A method for feeding doses of an infusion product for making filter bags, wherein it comprises at least the following steps:
preparing a first quantity, by weight, of infusion product less than a predetermined quantity, by weight, of a programmed dose of infusion product, in a first tubular channel;
depositing, by falling, the first quantity of infusion product in a container positioned on a platform which is movable relative to the tubular channel;
weighing the first quantity of infusion product deposited;
preparing a second quantity of infusion product in a second tubular channel, after the previous first channel relative to a feed direction of the platform, of a quantity of product, by weight, useful for reaching the weight of the programmed dose;
moving the platform to allow the container to move from the first to the second tubular channel;
depositing, by falling, the second quantity of infusion product in the container;
weighing the quantity of infusion product present in the container;
moving the platform for carrying the container with the programmed dose of infusion product beyond the second tubular channel;
discharging the dose from the container.

12. The method according to claim 11, wherein there is a plurality of containers positioned one after the other on the platform and a plurality of tubular channels positioned one after the other and with a number smaller, by at least one, than the number of the containers, and wherein there are the following steps:
preparing a first quantity, by weight, of infusion product less than a predetermined quantity, by weight, of a dose of infusion product, in a first tubular channel;
depositing, by falling, the first quantity of infusion product in a container positioned on the platform which is movable relative to the first tubular channel;
weighing the first quantity of infusion product deposited in the container;
preparing a second quantity of infusion product in a second tubular channel, after the previous first tubular channel relative to the feed direction of the platform, of a quantity of product, by weight, additional to the first quantity of infusion product;
moving the platform to allow the container to move from the first to the second tubular channel;
depositing, by falling, the second quantity of infusion product in the container;
weighing the quantity of infusion product present in the container;
preparing a third quantity in a third tubular channel, after the previous second tubular channel, of a quantity of product, by weight, useful for reaching the weight of the programmed dose;
moving the platform to allow the container to move from the second to the third tubular channel;
depositing, by falling, the third quantity of infusion product in the container;
weighing the quantity of infusion product present in the container;
moving the platform for carrying the container with the programmed dose of infusion product beyond the third tubular channel;
discharging the dose from the container.

13. The method according to claim 12, wherein each step of preparing and depositing quantities of product is performed simultaneously by two tubular channels side by side, with equal quantities, by weight, of infusion product, in two containers which are contiguous to each other.

14. The method according to claim 12, wherein, before the last preparing and feeding of the quantity, by weight, of infusion useful for reaching the weight of the programmed dose, there is a step of stopping and weighing the container(s) without feeding and depositing the infusion product.

* * * * *